(No Model.) 2 Sheets—Sheet 1.

E. P. BAVILLE.
GROOVED PULLEY.

No. 361,573. Patented Apr. 19, 1887.

Attest:
Hervey J. Knight
Geo. L. Wheelock

Inventor:
Edmond P. Baville,
By
Knight Bros.
Attys.

(No Model.) 2 Sheets—Sheet 2.
E. P. BAVILLE.
GROOVED PULLEY.

No. 361,573. Patented Apr. 19, 1887.

Attest:
Hervey Knight
Geo. L. Wheelock

Inventor:
Edmond P. Baville,
By
Knight Bros
Atty's.

UNITED STATES PATENT OFFICE.

EDMOND PIERRE BAVILLE, OF BRUSSELS, BELGIUM.

GROOVED PULLEY.

SPECIFICATION forming part of Letters Patent No. 361,573, dated April 19, 1887.

Application filed October 27, 1886. Serial No. 217,321. (No model.) Patented in Belgium July 22, 1886, No. 73,925, and in England September 10, 1886, No. 11,533.

*To all whom it may concern:*

Be it known that I, EDMOND PIERRE BAVILLE, a subject of the King of Belgium, residing at Brussels, in the Kingdom of Belgium, have invented certain new and useful Improvements in Pulleys, (for which I have obtained Patents in Belgium, No. 73,925, dated July 22, 1886, and England, No. 11,533, dated September 10, 1886,) of which the following is a specification.

This invention relates to that class of pulleys which are provided with peripheral grooves of such shape as to cause the cable to assume a serpentine position within the groove, the object of the invention being to prevent the cord or cable from slipping when running at great speed or under heavy strain, or when the machinery is started suddenly.

The invention consists in certain features of novelty, which are hereinafter particularly pointed out in the claims, being first fully described with reference to the accompanying drawings, in which—

Figure 1:
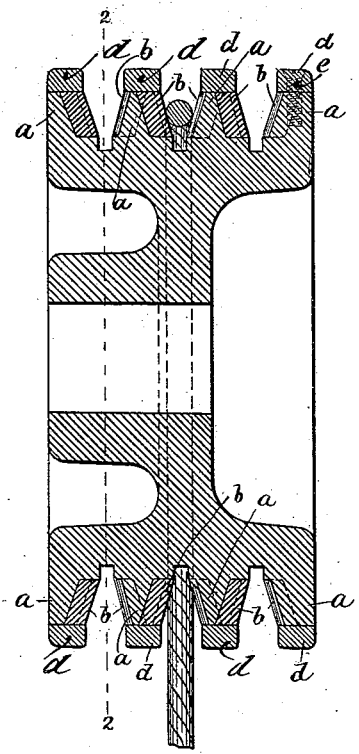
Figure 2:
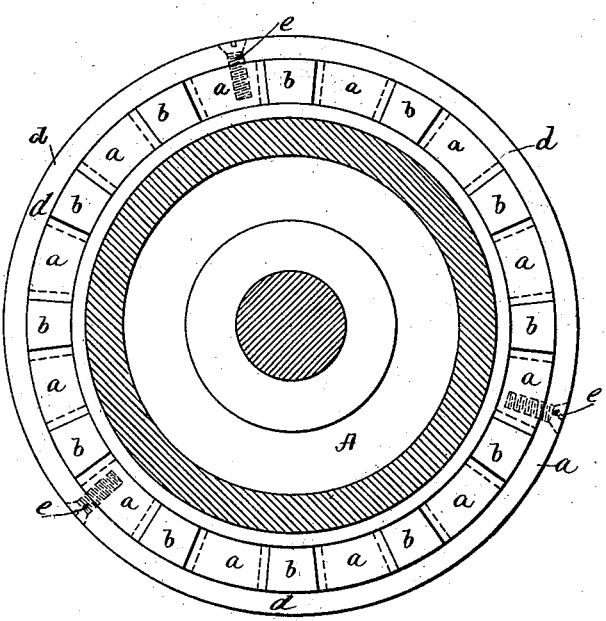
Figure 3:
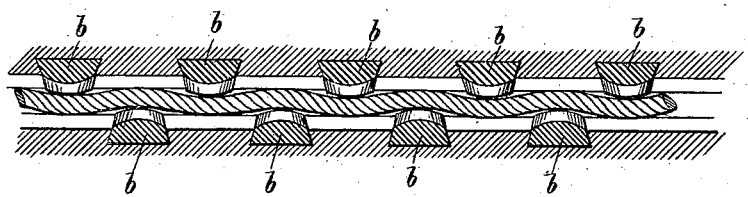
Figure 4:
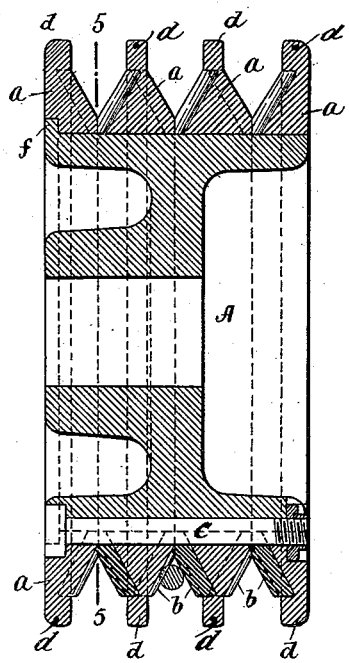
Figure 5:
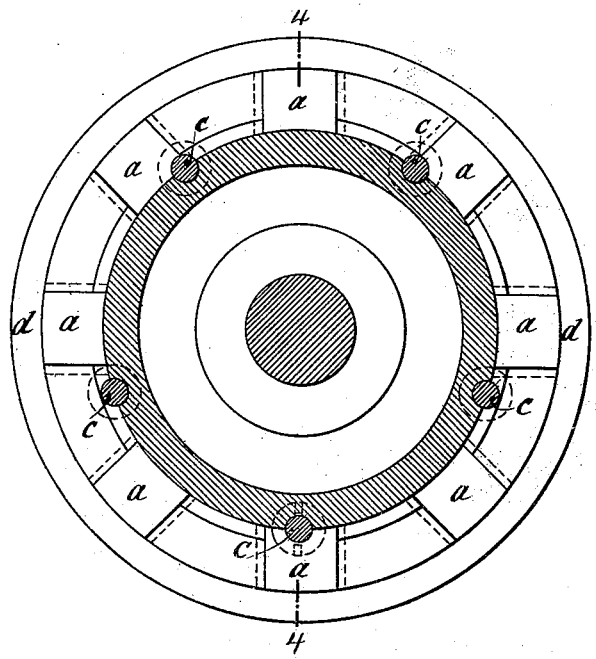
Figure 6:
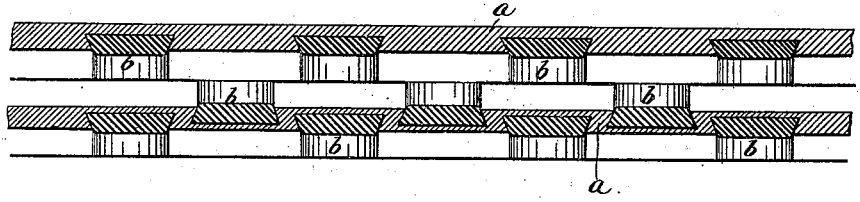

Figure 1 is an axial section of a pulley embodying the invention and having three grooves. Fig. 2 is a section thereof on the line 2 2, Fig. 1. Fig. 3 is a view showing the development of so much of the rim or periphery as is necessary to illustrate one of the grooves and the cord or cable resting therein. Figs. 4, 5, and 6 are views corresponding to Figs. 1, 2, and 3, respectively, showing the invention under a modification.

A represents the body of the pulley, which is provided with any desired number of peripheral flanges or annular projections, $a$, according to the number of peripheral grooves which it is desired that the pulley shall have.

$b$ represents ribs which project from the flanges into the grooves, the ribs on the opposite sides of the grooves being alternately arranged—that is to say, the ribs on one side being opposite the spaces between the ribs on the other side—so that the cable will not be pinched between opposing ribs, but will be deflected and made to assume a zigzag or serpentine shape, as represented more particularly in Figs. 3 and 6.

I am aware that so much of the device shown as has thus far been described in detail is not in itself new, and such I do not claim, my invention being confined to the details hereinafter described.

The annular flanges are provided with radial dovetailed grooves for the reception of the ribs $b$, whose backs are of corresponding shape. The ribs $b$ are preferably formed of rubber, leather, or other suitable yielding material which will not injure the cable, and are made removable, so that they may be replaced when worn. This feature of the invention (*i. e.*, the removability of the ribs) is, however, not confined to ribs of any particular material, but is alike applicable to all. In Figs. 1 and 2 the flanges $a$ are shown as formed integrally with the body A of the pulley, the radial grooves being open at their outer ends for the reception of the ribs. After the ribs are all inserted a ring, $d$, is slipped over each of the flanges $a$ and secured by screws $e$, the ribs being of such width that they extend beyond the edges of the flanges $a$ and even with the outer surfaces of the ribs $b$, as shown in Fig. 1.

In Figs. 4 and 5 I have shown the periphery of the body A of the wheel of cylindrical shape and provided at one end only with a short marginal flange, $f$. The flanges or enlargements $a$, instead of being formed integrally with the body A of the pulley, are formed separately and placed on the body A, all being held together by screw-bolts $c$. In this event the rings $d$ are also dispensed with, the dovetailed or undercut grooves for the reception of the ribs $b$ being closed at their outer ends and opened at their inner, the ribs being inserted before the rings are slipped over the body A. Fig. 4 shows the ribs $b$ inserted in the grooves on the under side of the pulley, the grooves on the upper sides being without ribs, for the purpose of illustrating more clearly the manner in which the outer portion of the removable flanges $a$ constitute rings $d$, which close or overhang the outer ends of the said grooves for preventing the displacement of the ribs. In both forms of the invention the flanges or enlargements $a$ are of such shape that the groove formed between them will be of substantially V shape, the surfaces of the ribs $b$ being parallel with the surfaces of the flanges, to which they are respectively secured. With this arrangement, as the cable comes successively to bear upon the ribs $b$ it will slide down the inclined faces thereof, first in one direction and then in the other, whereby it is made to assume the serpentine shape shown in Fig. 3.

I am aware that the grooves or faces of pulleys have been covered with leather and rubber; but such is not the equivalent of my invention.

Having thus described my invention, what I claim as new therein, and desire to secure by Letters Patent, is—

1. A pulley having on its periphery annular flanges and ribs or enlargements of yielding material projecting from the flanges into the groove between two adjacent flanges, the ribs on the opposite sides of the groove being alternately arranged, substantially as set forth.

2. A pulley having on its periphery annular flanges or enlargements and ribs secured removably to said flanges and projecting therefrom into the groove between them, substantially as set forth.

3. A pulley having on its periphery annular flanges or enlargements, said flanges being provided with grooves, ribs secured removably within said grooves, the grooves in the opposing faces of two adjacent flanges being alternately arranged, substantially as and for the purpose set forth.

4. A pulley having on its periphery annular flanges or enlargements, the opposing faces of two adjacent flanges or enlargements being provided with alternating undercut grooves, removable ribs inserted in said grooves, and a ring overhanging the ends of the grooves for preventing the displacement of the ribs, substantially as set forth.

5. A pulley, A, having integral peripheral flanges or enlargements $a$, said flanges or enlargements being provided with alternately-arranged undercut grooves, ribs $b$, placed removably in said grooves, and the removable rings $d$, surrounding said flanges or enlargements, substantially as and for the purpose set forth.

In testimony whereof I hereunto set my hand.

EDMOND PIERRE BAVILLE.

Witnesses:
 LÉON DOCGUIER,
 AUG. FOERISSEN.